United States Patent [19]
Baker

[11] 3,812,661
[45] May 28, 1974

[54] HARVESTING MACHINE WITH CROP SAVING ATTACHMENT

[76] Inventor: Clinton F. Baker, R.R. No. 4, Box 49, Fredonia, Kans. 66736

[22] Filed: May 1, 1973

[21] Appl. No.: 356,163

[52] U.S. Cl............................ 56/14.4, 56/97, 56/128
[51] Int. Cl............................................. A01d 45/02
[58] Field of Search............. 56/14.3, 14.4, 94–119, 56/126–130

[56] References Cited
UNITED STATES PATENTS

| | | | |
|---|---|---|---|
| 394,989 | 12/1888 | Miller | 56/128 |
| 643,716 | 2/1900 | Green et al. | 56/100 |
| 887,311 | 5/1908 | Charlton | 56/128 |
| 2,724,941 | 11/1955 | Zwiesler | 56/17.6 |
| 2,765,612 | 10/1956 | Raumaker | 56/97 |
| 2,981,045 | 4/1961 | Blanshine et al. | 56/99 |
| 3,126,691 | 3/1964 | Krahn et al. | 56/119 |
| 3,139,718 | 7/1964 | Rickerd et al. | 56/119 |

*Primary Examiner*—Russell R. Kinsey

[57] ABSTRACT

A harvesting machine for row crops including a plurality of transversely spaced catchers extending forwardly and slightly downwardly from above the deck or platform of the machine and over the sickle bar to terminate at a forward end spaced substantially in advance of the sickle bar. Each catcher is mounted for swinging movement about a vertical axis that is substantially in front of the sickle bar, whereby a row of plants is accommodated between and tends to force compliance by swinging alignment of the catchers with the crop row with the catchers lifting fallen or lodged plants and catching inadvertently dislodged plants.

22 Claims, 9 Drawing Figures

HARVESTING MACHINE WITH CROP SAVING ATTACHMENT

The present invention relates to new and useful improvements in attachments for harvesting machines for saving fruit that may be prematurely separated from the plants and dropped upon the ground, and more particularly relates to such an attachment and a harvesting machine equipped with such an attachment to position the latter close to the ground while extending transversely a substantial part of the interval between adjacent rows of plants.

The fruit of some row crops such as soybeans is subject to serious losses during harvest. When soybeans, normally planted as a row crop, are harvested by conventional harvesters or combines, the beans are subject to being prematurely shattered or jarred loose from the pods upon a minor degree of agitation of the plants unavoidably incurred upon the advance of harvesting machines.

Furthermore, some plants, such as soybeans, can fall or become lodged so as to escape cutting in whole or part.

Conventional harvesting or combining machines include a transversely extending cutter means or sickle means that extends along the leading edge of a deck or platform. A driven reel urges relative rearward movement of plants relative to the cutter means as the cutter advances into the proximity thereof and serves to urge plants severed closely above the ground by the cutter means upon the deck from which position the plants are suitably conveyed as by auger means and the like to machine components that separate the beans from the pods and deliver the same into a bin on the machine for eventual truck transport to storage facilities.

Agitation of plants so as to cause fruit to separate and fall upon the deck ordinarily occasions no loss of the fruit as such separated fruit falling upon the deck will normally proceed through the machine to the bin along with the fruit that does not separate until compelled to do so by operation of machine components specifically provided to effect such separation. However, agitation of plants caused by advance of the cutter means, the deck, and so forth, either directly or indirectly by the jostling of plants adjacent thereto may and often does cause fruit to be jarred, shattered or otherwise separated from the plants so as to fall upon the ground and be thereby lost to any economic means of recovery. Such loss from plants occasioned by premature fruit separation can occur prior to, during or after severance of the plant from the ground.

The purpose of the present invention is to catch and recover the fruit of a row crop such as soybeans that are prematurely dislodged, shattered or separated from the plants that would otherwise fall upon the ground.

It is another purpose of the present invention to enable the selectable conversion of conventional combines such as commonly used for nonrow crops, such as those manufactured by and known as John Deere, Gleaner and Massey Harris combines, for realization of the purpose of the preceding paragraph.

Another purpose of the invention is to provide apparatus that will not only catch inadvertently dislodged fruit, but which will also lift or elevate fallen or lodged plants to a height such that they can be properly cut and the fruit of such lifted and cut plants be collected in the usual manner.

Apparatus intended to carry out some of the foregoing purposes have been known heretofore as disclosed, for example, in the Willmar Sunflower Attachment disclosed in the advertisement of the Willmar Manufacturing Company, Willmar, Minn. 56201 in the Aug. 3, 1968 issue of *The Dakota Farmer*.

It is further a very important purpose of the present invention to enable the maintenace of proper orientation of the catchers and the plant rows; and to accomplish this despite errors in steering of the harvesting machine due to lack of rapt and constant attention by the operator and/or crooked rows, and to realize such purpose in such difficult field areas as at turnarounds at field end boundaries, etc.

Yet another purpose of the present invention is to provide catchers that independently can slide on and follow ground surface irregularities during machine operation, but which can be lifted clear of the ground when the deck or platform is elevated to transport or traveling position.

Closely related to the purposes of the preceding paragraphs are the closely related purposes of providing a catcher or crop saving means which tends to orient itself properly with plant rows in an automatic fashion by coacting with the plant rows, and of providing such a means that greatly relieves the operator of the tension and the speedy onset of fatigue that results from constantly straining to steer properly. Human factors are well recognized in importance nowadays, and in the art to which the present invention pertains, it is obvious that fatigue imposes still greater strain and accelerates the accumulation of or depth of fatigue and its costly consequences.

An important aspect of the invention involves an attachment for use with a harvesting machine of the type having a deck provided with an elongated cutter means extending along the forward marginal part of the deck; said attachment comprising a catcher having front and rear ends, said catcher being comprised of a substantially flat and horizontal plate that is forwardly tapered adjacent its front end, said plate having opposite side edges provided with upstanding side walls, said rear end of the plate being defined by a rear edge portion of substantial transverse extent that is substantially free of any upstanding obstructions and adapted to slidingly rest on the forward marginal part of the deck, and catcher mounting means underlying the catcher and pivotally connected to the latter about a vertical axis relatively close to its forward end as compared to its rear end, said last means extending rearwardly from said axis and being provided at a position spaced rearwardly of the rear end of the catcher with means adapted to be secured to the deck, whereby the catcher can be attached to have its front end and the pivotal connection thereof disposed forwardly of the cutter means and with its rear end overlying and supported on the deck.

Another important aspect of the invention has to do with a row crop harvesting machine of the type including a deck for receiving thereon plants severed from a row thereof by an elongated cutting means that extends along the forward and transversely extending horizontal edge of the deck preparatory to separating the fruit, the combination therewith of means for reducing losses of fruit by premature separation of the latter from the plants, said means comprising an elongated catcher carried by the machine to project its forward end forwardly of the cutting means, means mounting the catcher on the machine for oscillatory movement about a vertical axis that is adjacent to the forward end of the catcher and substantially forward of the cutting means, said catcher having a width adapted to be movable between and in spaced proximity to the lower parts of adjacent plant rows, and said catcher having a rear end portion disposed above the cutting means and having a rear edge overlying the deck.

The purposes, features, operation and advantages of the present invention will be readily appreciated on considering the following description of a preferred embodiment of the invention, such description being given in conjunction with the accompanying drawings illustrative thereof, wherein:

Referring now to the drawings wherein like parts are designated by like reference numerals throughout the various views, the reference numeral 10 designates generally a conventional harvesting machine or combine that is equipped with the row crop saving attachment of this invention that is designated generally at 12.

Apart from the attachment 12, the machine or combine 10 is entirely conventional, is well known and representative of a great variety of functionally equivalent machines in extensive and widespread use. It will become manifest to those of even very modest familiarity with the art that the attachment 12 can be employed with little, if any, improvisation with substantially any conventional combine. Such improvisation at most need only involve accommodating by any of many obvious expedients the structure of securance of the attachment to the various shapes of conventional combines as to the shape of the underside of the deck or platform rearwardly of the sickle or cutter means.

The representative harvesting machine or combine includes a deck or platform 14 for receiving thereon plants severed from the ground by an elongated sicle or cutter means 16 mounted on the forward edge 18 of the platform 14.

The leading edge 18 of the platform 14 is horizontal and extends transversely, that is, at right angles to the direction of advance of the machine 10 when the latter is proceeding straight forward. The machine 10 includes ground support and traction wheels 20 and 22 as well as a pair of ground support and dirigible wheels 24 and 26.

The machine 10 also conventionally includes a prime mover for powering through customary mechanical and hydraulic intermediaries the drive or traction wheels 20 and 22, the steering of the dirigible wheels 24 and 26; none of which is shown as it is all well known, understood and so commonplace in the art. Illustration and/or detailed description of such conventional apparatus would serve no useful purpose and would tend strongly to obfuscate the present invention and its operation.

Figures 1, 2, 3:
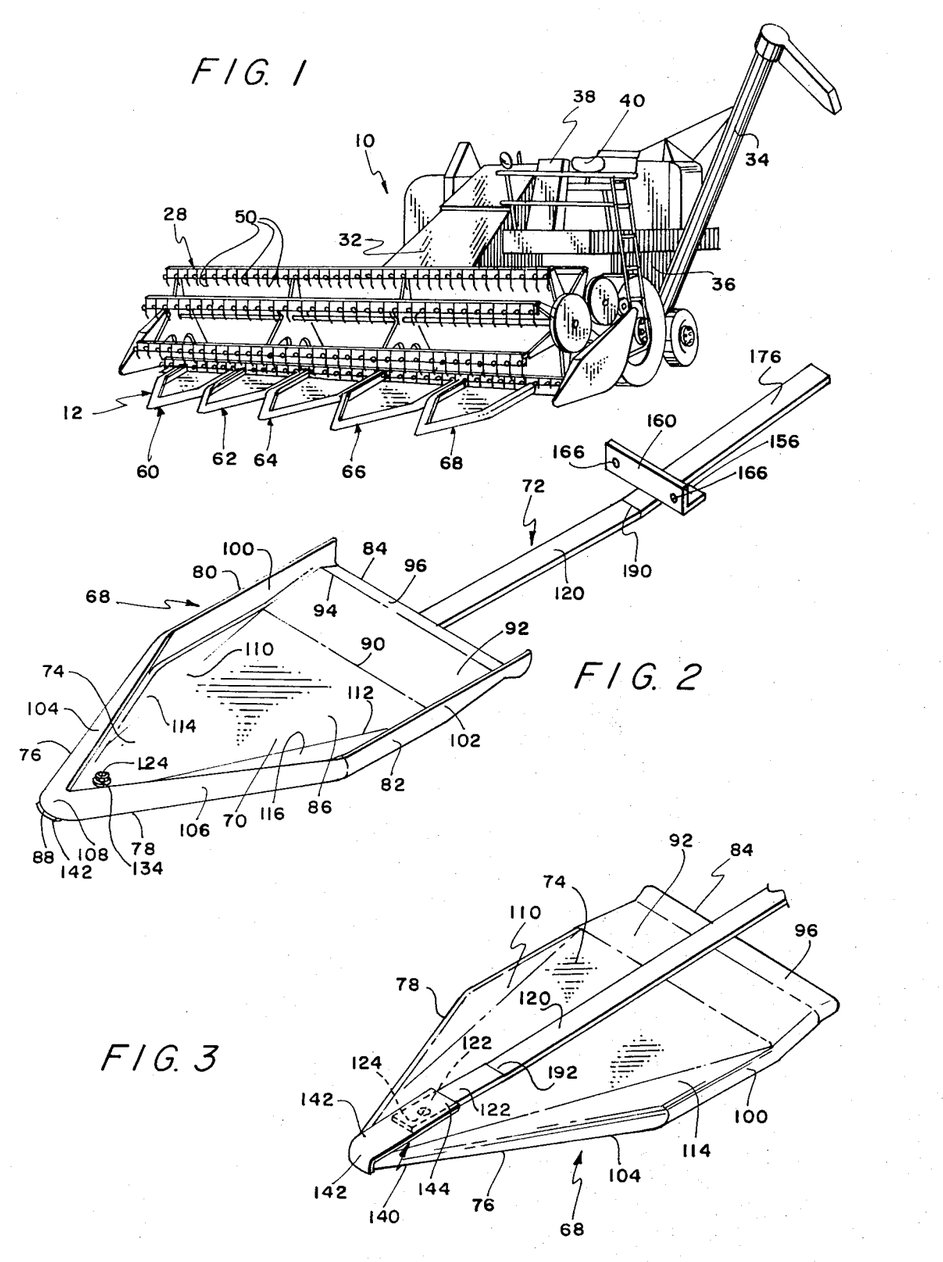
FIG. 1 is an isometric view of a harvesting machine or combine with the crop saving attachment of the invention mounted thereon; all of which is shown in operating or cutting position.
FIG. 2 is an enlarged isometric view of one of the catchers and the mounting means thereof.
FIG. 3 is a broken isometric view of the under side of the forward end of the structure shown in FIG. 2, hidden parts being shown in dashed outline.

The prime mover has customary driving connections to the power driven sickle means 16; a reel 28; means inclusive of an auger means 30 for moving several plants, foliage, fruit, and the like, to threshing or fruit separating equipment partially enclosed in a housing 32; such threshing equipment; means inclusive of an auger tube 34 for discharging fruit from a storage bin 36 wherein separated fruit is collected; conventional means, not shown, for raising and lowering the platform 14 between an elevated, transport or traveling position and a lowered and operative harvesting position such as shown in FIG. 1 such as to be relatively closely spaced above the ground surface. None of such units or the driving connections or the controls therefor disposed on or adjacent the operator's console 38 are illustrated and/or described in detail as such is entirely unnecessary considering the well known state of the art and for the reason that such would greatly obfuscate an understanding of the instant invention. It will hardly aid or significantly enlighten the initiated to point out that from an operating position seated upon a seat 40 an operator can view both the ground and the plant growth thereon immediately in advance of the vehicle over and through the reel 28 and the action of reel 28 and auger 30 relative to their handling of plants prior to and after their severance by the cutter means 16 and deposit on the deck or platform 14 as such is all in accordance with and common to conventional harvesting machines.

While any conventional type of elongated cutter means equivalent to the sickle means 16 can be employed in the practice of the invention, an actual working embodiment of the invention incorporating a conventional sickle-type cutter 16 has performed in such a trouble free and excellent manner as to cause a preference therefor. Such sickle means 16 is well known and includes spaced, forwardly pointing, fixed guard elements such as the one shown at 42 in FIG. 6 that coacts with an elongated sickle bar or blade 44 that is mounted for and driven to reciprocate and thereby effect the desired plant cutting action.

Such is also the case relative to the reel 28, as many conventional reel types could be employed to substantial advantage; however, the type of reel 28 illustrated is deemed satisfactory because of the excellent results obtained with such in actual field testing under unusually difficult field conditions (wet ground and soybean plants exceedingly susceptible to premature, costly and inadvertent separation or shattering of the beans from already open and/or brittle and loosely attached pods). The reel 28 indicated as presently preferred is preferred on the basis of actual and very trying field experience is as will be readily recognized as the type that includes a cylindrical array of circumferentially spaced and axially extending members 46, each of which carries spaced spring fingers or raking elements such as indicated at 48 that are driven so as to be maintained in a downwardly extending position from their respective members 46. The elements or fingers 48 are, as is conventional, of resilient character so as to yield resiliently or to flex on encountering obstacles, thereby to avoid breakage or forced stoppage of the reel 28 and also to enable the fingers 48 to contact and safely bypass or sweep other components of the machine 10. The resilient character of the fingers 48 enables the lower ends 50 of the fingers to sweep or pass nearer to the ground surface than would be the case if the reel 28 were entirely of rigid and inflexible nature.

Another reason for preference of the illustrated reel is, as will be explained later, for the express reason that the finger ends 50 can be caused to sweep or rake quite close to certain parts of the attachment 12 when such operation appears to be desired or expedient to the operator. Such resiliency or flexibility also is in accordance with and will excellently accommodate relative vertical movement of the attachment 12 on encountering humps, bumps or ground surface irregularities as will be subsequently described in detail.

As stated above, other conventional type reels can be employed, possibly with equally gratifying results, and reels with rubber blades or paddles can work particularly well.

As thus far described the machine 10, apart from the attachment 12, is entirely conventional and its structure, function and operation will be clearly understood by those of extremely modest familiarity with present day harvesting equipment. No claim is made to any novelty or invention in the machine 10 except in combination with the attachment 12, and with respect to the attachment 12, and parts thereof per se.

Proceeding now to the attachment 12, the latter is comprised of a plurality of identical catcher units such as those designated generally at 60, 62, 64, 66 and 68 in FIG. 1. Since the catcher units are identical to each other a detailed description of the catcher unit 68 will suffice for the others.

The catcher unit 68 comprises a generally flat catcher or panlike structure 70 and a mounting means 72 therefor. The catcher 70 can be made of any suitable material that is of reasonable cost, durability as to mechanical wear and corrosion, strength, and various other factors that obviously enter into any selection of component material selection such as ease of fabrication and the like. The working model previously alluded to was in large measure made of malleable-type sheet steel stock of 18 gauge. Other types of sheet steel of greater or less thickness could be employed. Inasmuch as a minor degree of rusting of the catchers of the working model occurred as would be expected during a prolonged period of storage under moist conditions, the steel or iron parts of the catcher unit can, if desired or deemed expedient, be plated or coated with a wear and corrosion resistant substance such as chromium. Should the cost not be judged prohibitive the cathcer can be made of stainless steel. Alternatively, the catcher need not be metallic and can be made of any suitable plastic or synthetic resin material such as nylon, a carbonate resin, etc. Those skilled in the art of harvesting machines will have no difficulty selecting suitable materials as the various desideratums are or will become evident as the structure and function of the catcher 70 unfolds.

The catcher or panlike structure 70 is generally flat, and is symmetrical about a vertical, forwardly and rearwardly extending, central or medial plane, and has an overall configuration, in plan view, of a boat having a V-shaped bow or front portion 74 defined by forwardly converging side edges 76 and 78 parallel side edges 80 and 82, and a wide blunt or square stern defined by a rear edge 84. The catcher or pan has a relatively large forward central portion 86 that is essentially planar extending from adjacent the front end 88 to a transverse and integral juncture 90, situated about midway of the longitudinal extent of the parallel edges 80 and 82, with a relatively smaller rear portion 92 that is essentially planar and inclined upwardly and rearwardly from the plane of the portion 86 by an acute angle on the order of about 10° to about 20°, more or less. There is no criticality to such angular relationship, but it does enable the underside of the catcher 70 to conform better to the shape of the guards 44 that are spaced a short interval below the catcher 70 when the latter is in its lowermost position. Indeed, the rear end of the catcher portion 92 merges integrally at 94 with a relatively downwardly and rearwardly inclined trailing portion 96. The rear edge of the trailing portion 96 is the trailing or rear edge of the catcher 70 and is adapted to rest and slide upon the deck or platform 14 adjacent to and rearwardly of the cutter means 16, it being noted that the angular relationships of the catcher portions 86, 92 and 96 conform to spacing the catcher 70 somewhat above the cutter means 16 when the trailing edge 84 of the catcher 70 rests upon the deck 14 in sliding engagement therewith.

The entire periphery of the catcher 70, excepting only the portion defined by the trailing or rear edge 84, is upturned or rolled upwardly to define upstanding, spaced and parallel side walls 100 and 102 that merge with forwardly converging, upstanding side walls 104 and 106, and the latter join and smoothly merge together at the front end of the catcher 70 in a smoothly rounded upstanding front end wall 108, as plainly shown in FIGS. 2 and 3.

The side walls 100, 102, 104, 106 and 108 are relatively very short in height as compared to the longitudinal and transverse dimensions of the catcher 70, as their primary function is to prevent any fruit such as soybeans or the like on the catcher 70 from rolling or otherwise being discharged from the catcher 70 except over the trailing edge 84 of the latter. To enhance the effectiveness of this primary function, the walls 100, 102, 104, 106 and 108 can be somewhat inturned in their uppermost extents as clearly shown so as to more effectively resist or oppose the movement of soybeans or the like thereover.

Another function of the upstanding side walls is to reinforce and impart strength and rigidity to the catcher 70.

To facilitate the rolling or turning of the side walls of the catcher 70, the lateral margins of the catcher portion or bottom wall 86 can be bent upwardly a few degrees along crease lines 110 and 112 that converge forwardly of the bottom wall portion 92 to constitute upwardly and outwardly sloping bottom wall panels 114 and 116; such structure being plainly illustrated in FIGS. 2 and 3.

Figure 4:
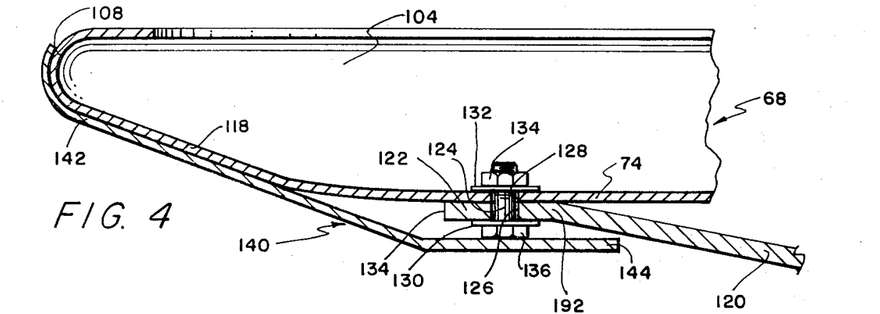
FIG. 4 is an enlarged fragmentary vertical sectional view taken along the central medial plane of symmetry of the structure shown in FIGS. 2 and 3.

As in the case of skis and for somewhat analogous reasons the forward end portion of the bottom wall 74 is upwardly sloped as indicated at 118 and plainly shown in FIG. 4.

The mounting means 72 comprises an elongated steel bar 120 that may conveniently be rectangular in section as shown. The bar 120 can be plated or otherwise coated to control or prevent corrosion.

The bar 120 underlies the catcher 70 and extends rearwardly thereof with the forward end portion 122 of the bar 120 being pivotally secured to the catcher 70 about a medial vertical axis that is adjacent the forward end 88 of the catcher and well forward in the laterally and forwardly converging portion of the catcher 70. The pivotal connection and securance of the bar 120 to the catcher 70 can conveniently take the form of a headed bolt 124 extending upwardly and rotatably through aligned openings 126 and 128 in the bar 120 and the catcher bottom wall portion 74 as well as through washers 130 and 132 respectively underlying and overlying the bar 120 and the wall 74. A nut 134 is threaded upon the bolt 124 and secured in any suitably manner against rotation on the bolt 124 (as by a jam nut, use of a castellated nut, cotter pin, limited extent of the threading on the bolt, or the like, none of which is shown) at a position such that the bar 120 and the wall 74 are drawn into close proximity of each other but with free working clearance being established so that the catcher 70 can pivot or oscillate relative to the bar 120 to which it is secured about the vertical axis defined by the vertical axis of the bolt 124. Superfluous to say, numerous other ways to pivotally secure the catcher 70 upon the forward end portion 122 of the bar 120 will come to the mind of those skilled in the art to accomplish the desired fucntional relationship.

As the forward end 134 of the bar and the head 136 of the bolt 124 constitute impediments to movement of machine 10 when the catcher 70 and the bar 120 rest on the ground, and may constitute sites upon which trash can accumulate there is provided streamlining or fending means 140 to avoid such consequences and to exclude to some degree the ingress of foreign matter between relatively movable wear points in the pivotal connection of the catcher 70 on the bar. Such fending means 140 comprises an elongated strap 142 of any suitable material such as steel of about the width of the bar 120 that has its forward end portion 144 wrapped about the forward end wall 108 of the catcher and then rearwardly along the underside of the sloped bottom wall portion 118 as clearly shown in FIG. 4. The strap is fixedly secured to walls 108 and 118 in any suitable manner as by welding or the like. The strap thence extends downwardly and rearwardly to terminate in a horizontal and rearwardly extending rear portion 144 that closely underlies the forward end portion 122 of the bar 120 and the head 136 of the bolt 124. Indeed, the head 136 can engage the strap portion 144 as shown and thereby preserve the spacing of the bar 120 and the strap portion 144. Manifestly, little if any friction can occur as between the head and the strap portion 144 as to impair significantly the freedom of pivotal movement of the catcher 70 relative to the bar 120.

The mounting means 72 includes provision for securing the bar 120 to the deck 14 in such a manner that the bar 120 projects straight forwardly of the cutter means 16 insofar as the horizontal plane is concerned, that is, straight ahead of the cutter means 16 in the direction of travel of the machine 10 when the latter is being steered straight ahead; the arrangement being such that the major portion of the longitudinal extent of the catcher 70 is disposed forwardly of the cutter means 16 and so that the vertical axis defined by the bolt or pivot pin 124 is substantially forward of the cutter means 16 and indeed such axis is preferably several times closer to the front end 88 of the catcher 70 than it is to the cutter means. The nature of the securance of the bar 120 to the deck or platform 14 of the machine is also such that the rear end portion of the catcher extends rearwardly over the cutter means 16 and so that the rear end or trailing edge 84 of the catcher 70 overlies and overlaps the forwardmost marginal part of the deck or platform 14, whereby fruit or soybeans discharged from the catcher 70 over the trailing edge 84 of the catcher 70 will be deposited on the deck or platform 14 so as to be processed through the machine 10 into the bin 36 thereof.

Furthermore, the nature of the securance of the bar 120 to the conventional parts of the machine 10 is such that a limited degree of vertical freedom of movement of the forward end portion 122 of the bar 120 is realized whereby the catcher 70 inclusive of its fending or fairing means 140 can ride along upon and slide upon an undulating or rough ground surface. While the bar 120 can simply be made of a material and of such dimensions that the resiliency and flexibility of the bar 120 alone can afford the desired degree of vertical freedom of movement of the catcher 70 (in which event the rear end of the bar can be extended under the deck 14 and simply bolted thereto in a rigid fashion), it is preferred that the bar 120 be of such strength and stiffness that the manner of securance to the machine 10 in and of itself should contribute substantially to the desired degree of vertical freedom of relative movement and such a securance is shown and hereinafter described.

It should be mentioned that while the illustrated and described securance of the bar 120 to the machine 10 is, of course, compatible with the particular type of conventional harvesting machine or combine illustrated, the illustrated and described securance can be readily modified and indeed may very well have to be modified to be compatible with some of the differences in detail in the conventional harvesting machines, especially as to the shapes of the undersides of the deck or platform 14. It will be obvious to those desiring to secure the bar 120 to various other harvesting machine configurations how to do so to effect the previously described functions of the securance, and this is all the more true in the light of the subsequently set forth operation of the machine 10 inclusive of its attachment.

Proceeding now to a description of the illustrated and exemplary mode of securance of the bar 120 to the conventional parts of the machine 10, an angle iron 150 is rigidly secured in any suitable manner to the underside of the deck 14 as by welding 152. The angle iron 150 is transversely extending, that is, parallel to the longitudinal extent of the cutter means 16, and is closely spaced rearwardly of the cutter means 16. The angle iron or mounting bracket 150 is fixed to the deck so as to establish a downwardly extending flange or rib 154.

Figures 5, 6, 7:
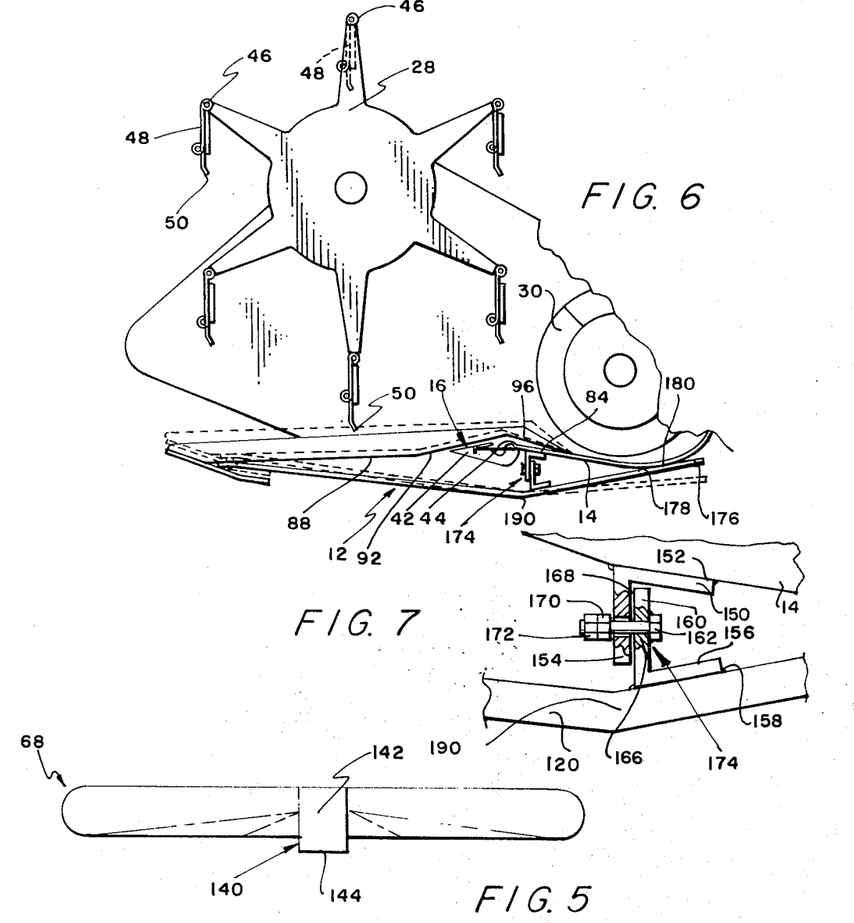
FIG. 5 is a front elevational view of the structure shown in FIGS. 2, 3 and 4.
FIG. 6 is a fragmentary side elevational view of forward parts of the machine shown in FIG. 1 with the outboard structure removed, and illustrates the limited vertical freedom of movement of the attachments by showing the same in full lines at one limit, and in dashed outline at its other limit.
FIG. 7 is a greatly enlarged fragmentary detail view, partially in section of the means securing the attachment of FIGS. 2, 3, 4 and 5 to the machine of FIG. 1.

A short transverse length of angle iron 156 is welded to the bar 120 at a position intermediate the extent of the bar 120 behind the trailing edge 84 of the catcher 70, such angle iron 156 including an upstanding flange 160. As shown in FIG. 7, the flanges 154 and 160 are, in the mounting of the attachment 68, overlapped and headed bolts 162 extend through pairs of aligned openings 164 and 166 respectively in the flanges 154 and 160. The flanges 154 and 160 are not drawn up tight against each other (note the space 168 therebetween to emphasize this point) and a nut 170 threaded on the bolt 162 is positioned to preserve such looseness. A jam nut 172 is threaded up tight against the nut 170 so the latter cannot change its position on the bolt 162. While the openings 166 can receive the shanks of the bolts 162 tightly therethrough, the openings 164 are oversize relative to the bolts 162, the arrangement being such that the bar 120 is allowed essentially no lateral movement as about a vertical axis (when the spacing of the openings 166 is considered), the bar 120 is permitted some oscillatory movement about a horizontal and transverse axis situated roughly in the region of overlapping flanges 154 and 160. In other words, the structure shown in FIG. 7 constitutes a crude form of hinge that serves its intended hinge function very well, and which structure is very simple, durable and rugged, in addition to lending itself to convenient and speedy mounting and dismounting of the attachment 68 on the machine 10.

In order to limit downward movement of the bar portion 122 and to reduce or minimize the force with which the rear end of the catcher 70 bears on the deck or platform 14, the bar 120 extends rearwardly of the above described hinge structure or means 174 is indicated at 176 and such rear portion 176 underlies and normally bears against the underside 178 of the deck 14 as shown in full lines at 180 in FIG. 7. Such full line position is the normal position of the attachment 68 as the center of mass of the attachment inclusive of its mounting means is forwardly of the hinge means 174. The engagement 180 constitutes a limit to counterclockwise movement of the attachment about the hinge means 174 and it is of substantial importance that such limit means be provided, that is, the relationship and coaction between the bar portion 176 and the underside 178 of the deck 14, inasmuch as the platform or deck 14 can in the usual operation of the machine 10 be elevated far above harvesting position to a traveling or transit position and the attachment 68 be elevated therewith to a traveling or transit position while retaining its full line relationship to the deck 14 shown in FIG. 7. This is true while the hinge means 174 will permit the attachment 68 to move to the alternative position shown thereof in dashed outline in FIG. 7, such as when the forward end of the catcher 70 is pushed upwardly on encountering a hump in the ground surface, for example. Upward flexing is ultimately limited by the freedom of the hinge means 174.

It should be noted that the effective axis of the hinge means 174 is in the proximity of trailing edge 84 of the catcher 70 and consequently very little movement of the trailing edge 84 relative to the platform 14 occurs by reason of oscillation about the axis of the hinge means 174.

In order to appropriately orient the bar portion 176 relative to the underside 178 of the deck and to orient the bar portion 122 under the catcher portion 74, the bar 120 is bent slightly at 190 and 192, respectively.

The mounting bracket or angle iron 150 can be of length comparable to that of angle iron 156, and for attachment of only attachment 68, or the same may be greatly elongated and common to all the attachments 60, 62, 64, 66 and 68.

The medial planes of the attachments 60, 62, 64, 66 and 68 are transversely spaced along the extent of the cutter means 16 at intervals corresponding to the spacing of adjacent parallel rows of the plants to be harvested, such as soybean plants. Proceeding to describe the attachment 12 as specifically tailored for harvesting soybeans, the medial planes of the units 60, 62, 64, 66 and 68 are transversely spaced about 30 inches apart, namely, a distance equal to the spacing of the soybean rows. The transverse width of each catcher 70 is sufficiently less than the transverse spacing of the catchers 70 themselves that a row of soybean plants is accommodated with room to spare when the catchers 70 are riding on the ground and the machine 10 is traveling straight down straight rows and with the catchers 70 precisely straddling the rows. It is a desideratum that the catchers 70 be as closely spaced as possible, but realization of such desideratum must be tempered by the necessity of sufficient spacing between adjacent catchers 70 while keeping in mind that such spacing between adjacent catchers 70 is reduced, even though they may and usually are at least approximately parallel to each other, when they swing from parallelism with their vertical axis connection to the latter. Such reduction in spacing is the basic reason for the preceding language "room to spare."

When the actual working model previously referred to was applied to the harvest of soybeans having row spacings, center to center, of 30 inches, the centers of the catchers 70 were correspondingly spaced and the width of the catchers was 26 inches to obtain a spacing of 4 inches between adjacent catchers 70 when parallel and straight. Such catchers 70 were incidentally of 48 inches overall length with the vertical pivots thereof being 8 inches from the front ends of the catchers. The forward tapered extent of the catchers 70 is about 22 inches. The trailing edges of the catchers 70 overlap the forward edge of the platform at least 2 inches. The height of the front end of the catchers when resting on the ground was about 2 inches so that a lifting effect is produced relative to the cutter or sickle bar as the latter is usually adjusted to a height of about 4 or more inches. As shown, the catcher 70 slopes upwardly and rearwardly.

In the use of the machine 10 with its attachment 12, the machine 10 is driven down the direction of the crop rows with the machine driven to center the bars 120 between adjacent rows as accurately as the operator can without undue effort or excessive attention being made such as can quickly cause fatigue. The lateral parts of the catchers 70 underlie the foliage of the plants and as they are quite close to the main stems or trunks of the plants close to the ground level, soybeans prematurely separated from the plants and which would ordinarily fall as loss upon the ground are largely caught in or intercepted by the catchers 70 and ultimately discharged on the deck or platform 14. The upward and rearward slope of the catchers 70 coupled with their low forward height above the ground results in the catchers 70 passing below fallen or lodged plants and the consequent lifting or upward camming of the plants on machine advance so that such plants are harvested along with the unfallen plants.

Plants moving rearwardly relative to the catchers 70 by reason of advance of the machine 10 and/or by reason of the reel operation causes soybeans and other matter deposited on the catchers 70 to be swept from the catchers 70 onto the deck 14. This sweeping action is enhanced in the use of the illustrated type reel as the fingers 48, or rubber paddles if used, can sweep especially close to or if desired actually contact the catchers 70 to sweep the latter in their relative rearward motion.

Figure 8:
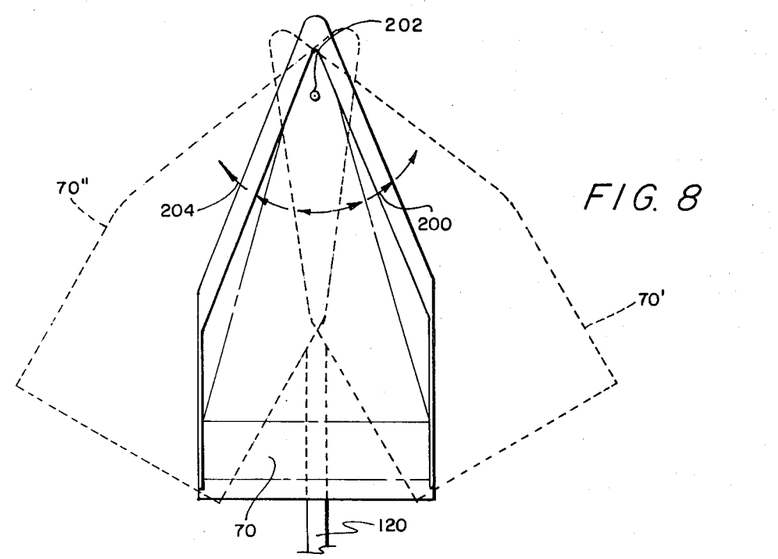
FIG. 8 is a fragmentary top plan view of the structure shown in FIG. 2, and illustrates particalarly the freedom of the catcher to oscillate about a vertical pivotal axis adjacent its front end by showing alternative positions thereof in dashed outline; and, FIG. 9 is a diagrammatic top view of the machine and illustrates with considerable angular exaggeration the manner in which the attachment parts can swing to align with turning movements of the machine, a right turn relationship of parts being indicated in full lines, and of a left turn in dashed outline.

If the operator deviates substantially from centering the bars 120 between rows to cause the bar 120 of FIG. 8 to come too close to the row of plants to the left thereof as seen in such FIG. 8, the catcher 70 will be caused to engage such row and by coaction therewith will cause the catcher 70 to swing from its full line straight tracking position in the direction of the arrow 200 about its vertical axis 202 (defined by the pivot bolt 124), and partially toward the dashed line position 70'. This results in the catcher 70 tending to automatically maintain itself closely disposed to the plants on its opposite sides noting that the rear portion of the catcher 70 moves to the right. Conversely, when the operator strays a bit far to the right, a compensating oscillation of the catcher 70 in the direction of the arrow 204 moves the rear part of the catcher to the left and partially toward the dashed line position 70''. Thus, the attachment 12 serves by reason of the catchers 70 projecting far in advance of the cutter means 16 and in advance of any substantial jostling presaging the approach of the remainder of the machine 10. Furthermore, as already explained, the attachment 12 continues to operate with virtually undiminished fruit saving efficiency even when the operator allows the bars 120 to drift from out of center or midrow positions.

While the automatic compensating function described above is of substantial importance, the ability of the catchers 70 to coact with the plant rows to orient most properly the former of maximized catching operation is of even greater importance during turning of the machine 10 (whether or not the path of the machine 10 corresponds to plant row curvature). An inexperienced machine operator may often overcorrect first one way and then the other when harvesting straight rows, and in this event the catchers 70 automatically pivot to keep in direct contact or at least close proximity to the rows of soybeans on both sides of each catcher 70.

Figure 9:
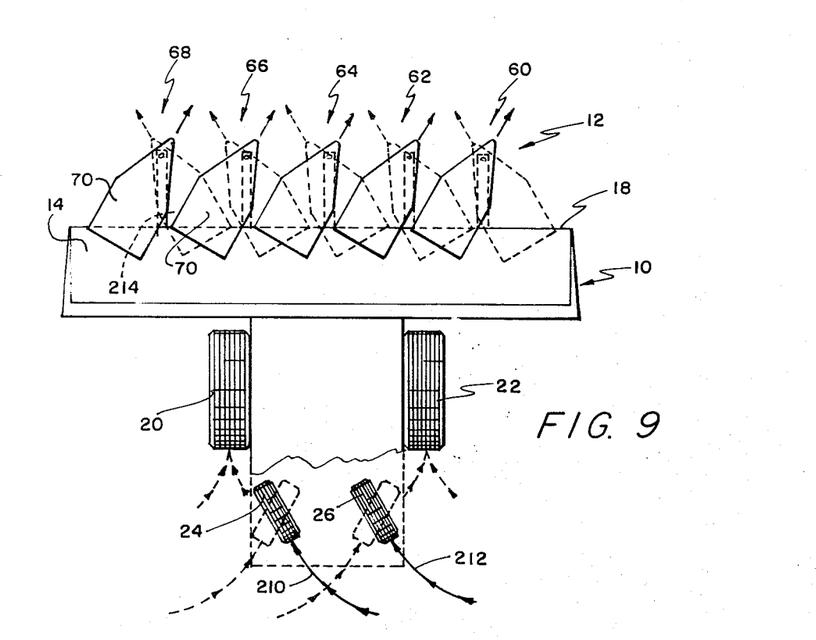

It is when the machine 10 is turned to follow turns in the rows that the pivoting feature of the catchers 70 is most beneficial especially since proper tracking by the operator is then most difficult if not absolutely impossible in the absence of the automatic feature of the operation of the catchers 70. For example, when the machine 10 is being turned hard to effect a right turn at the turnaround at the end of the field as indicated by the cramped full line indication of the dirigible wheels 24 and 26 shown in FIG. 9 and their direction of movement 210 and 212, any departure of the forward ends of the bars 120 from midway of the rows is compensated for by pivoting action of catchers 70 so as to automatically keep each catcher 70 closely adjacent the rows on its opposite sides. It is at the turnarounds that the greatest losses normally occur because of the greater likelihood of errors on the operator's part due to faulty depth perception and extraordinarily heavy agitation or jostling of the plants ahead of the reel and sickle. It will be noted that the catchers 70 of the attachments are, during such right-hand turn, caused to coact with the plant rows, not shown, to pivot the positions shown thereof in full lines in FIG. 9, and that the space 214 therebetween can accommodate a plant row therebetween, with beans prematurely separating from such row being caught by the catchers 70 of the units 66 and 68. Similarly, left-hand turns and travel paths and acompanying positions of the catchers 70 are shown in dashed outline in FIG. 9.

Again, the independent vertical axes pivoted catchers 70 ride upon the surface of the ground and can accommodate surface irregularities by reason of the individual horizontal axes hinge means.

Attention is now directed to the appended claims.

I claim:

1. In a row crop harvesting machine of the type including a deck for receiving thereon plants severed from a row thereof by an elongated cutting means that extends along the forward and transversely extending horizontal edge of the deck preparatory to separating the fruit, the combination therewith of means for reducing losses of fruit by premature separation of the latter from the plants, said means comprising an elongated catcher carried by the machine to project its forward end forwardly of the cutting means, means mouting the catcher on the machine for oscillatory movement about a vertical axis that is adjacent to the forward end of the catcher and substantially forward of the cutting means, said catcher having a width adapted to be movable between and in spaced proximity to the lower parts of adjacent plant rows, and said catcher having a rear end portion disposed above the cutting means and having a rear edge overlying the deck.

2. The combination of claim 1, wherein said mounting means includes provision enabling limited vertical movement of the catcher relative to the deck and the cutting means, whereby the catcher can rest and slide upon the ground during harvesting and accommodate ground surface slope irregularities.

3. The combination of claim 2, wherein the machine includes means for elevating the deck and the cutting means above the ground to a traveling position, and wherein the enabled vertical movement of the catcher is limited in its downward direction under the influence of gravitational forces to such an extent that the catcher is supported entirely by the machine and does not rest upon the ground 4. The combination of claim 1, wherein said catcher includes a forward end portion that is forwardly tapered in width so as to be of reduced width at a position spaced substantially forward of the cutting means, and said vertical pivot extending through the portion of the catcher of reduced width.

5. The combination of claim 1, wherein the rear edge of the catcher slidably engages and rests upon the deck rearwardly of the cutting means.

6. The combination of claim 1, wherein the catcher is substantially flat and has an upstanding peripheral margin about its periphery excepting its rear edge whereby fruit on the catcher is free to discharge solely onto the deck.

7. The combination of claim 1, wherein the mounting means includes a bar disposed below and secured to the deck to project forwardly therefrom under the cutting means and the catcher, and a vertical pivot pin joining the bar and the catcher to constitute the vertical pivot.

8. The combination of claim 7, including a runner secured to the catcher forwardly of the pivot pin extending downwardly and rearwardly about the forward end of the bar, whereby to preclude the lodgment of extraneous matter between the bar and the catcher.

9. The combination of claim 7, wherein the bar is secured to the deck by means enabling vertical rocking movement of the bar about a transverse horizontal axis, whereby the bar and the catcher can accommodate irregularities in the slope of the ground when they rest thereon.

10. The combination of claim 9, wherein the machine includes means for elevating the deck and the cutting means to an elevated position, and means for limiting the extent of vertical rocking movement of the bar such that the bar and catcher are elevated when the deck and the cutting means are moved to their elevated position.

11. The combination of claim 10, wherein the means for limiting rocking movement comprises said bar being secured intermediate its ends to the underside of the deck so that the bar includes a rearmost portion that extends rearwardly of the transverse horizontal rocking axis, and said rearmost portion of the bar being engageable with a portion of the machine to limit rocking movement of the bar in at least one direction.

12. The combination of claim 1, wherein the vertical height of the forward end of the catcher is substantially less than the height of the rear edge of the catcher, whereby fallen and lodged plants can be lifted by the passage of the catcher.

13. In a row crop harvesting machine of the type including a deck for receiving thereon plants severed from a row thereof by an elongated cutting means that extends along the forward and transversely extending horizontal edge of the deck preparatory to separating the fruit, the combination therewith of means for reducing losses of fruit by premature separation of the latter from the plants, said means comprising a plurality of transversely spaced catchers carried by the machine to project forward ends thereof substantially forward of the cutting means, means for mounting each of said catchers on the machine for oscillatory movement about a vertical axis that is adjacent the forward end of its respective catcher and which vertical axis is substantially forward of the cutting means, each catcher having a width adapted to be movable between and in spaced proximity to the lower parts of adjacent plant rows, said catchers having a spacing such that they are adapted to move on opposite sides of a row of plants, and each of said catchers having a rear end portion disposed above the cutting means and having a rear edge overlying the deck.

14. The combination of claim 13, wherein said mounting means includes provision enabling limited vertical movement of the catchers relative to the deck and the cutting means, whereby the catcher can rest and slide upon the ground during harvesting and accommodate ground surface slope irregularities.

15. The combination of claim 14, wherein the machine includes means for elevating the deck and the cutting means above the ground to a traveling position, and wherein the enabled vertical movement of the catchers is limited in its downward direction under the influence of gravitational forces to such an extent that the catchers are supported entirely by the machine and do not rest upon the ground.

16. The combination of claim 13, wherein each of said catchers includes a forward end portion that is forwardly tapered in width so as to be of reduced width at a position spaced substantially forward of the cutting means, and said vertical pivot extending through the portion of the catcher of reduced width.

17. The combination of claim 13, wherein the rear edges of each of the catchers slidably engages and rests upon the deck rearwardly of the cutting means.

18. The combination of claim 13, wherein each of the catchers is substantially flat and has an upstanding peripheral margin about its periphery excepting its rear edge whereby fruit on the catcher is free to discharge solely onto the deck.

19. The combination of claim 13, wherein the mounting means includes a bar disposed below and secured to the deck to project forwardly therefrom under the cutting means and the catchers, and a vertical pivot pin joining the bar and the catcher to constitute the vertical pivot.

20. The combination of claim 19, including a runner secured to each of the catchers forwardly of the pivot pin extending downwardly and rearwardly about the forward end of the bar, whereby to preclude the lodgment of extraneous matter between the bar and the catchers.

21. An attachment for use with a harvesting machine of the type having a deck provided with an elongated cutter means extending along the forward marginal part of the deck; said attachment comprising a catcher having front and rear ends, said catcher being comprised of a substantially flat and horizontal plate that is forwardly tapered adjacent its front end, said plate having opposite side edges provided with upstanding side walls, said rear end of the plate being defined by a rear edge portion of substantial transverse extent that is substantially free of any upstanding obstructions and adapted to slidingly rest on the forward marginal part of the deck, and catcher mounting means underlying the catcher and pivotally connected to the latter about a vertical axis relatively close to its forward end as compared to its rear end, said last means extending rearwardly from said axis and being provided at a position spaced rearwardly of the rear end of the catcher with means adapted to be secured to the deck, whereby the catcher can be attached to have its front end and the pivotal connection thereof disposed forwardly of the cutter means and with its rear end overlying and supported on the deck.

22. The combination of claim 21, wherein said means adapted to be secured to the deck enables a limited amount of vertical movement of the mounting means adjacent the pivotal connection relative to the deck, whereby the catcher can ride upon an undulating ground surface and yet be lifted above such ground surface when the deck is substantially elevated.

* * * * *